United States Patent

Tults

[11] Patent Number: 5,900,913
[45] Date of Patent: * May 4, 1999

[54] SYSTEM PROVIDING STANDBY OPERATION OF AN AUXILIARY DATA DECODER IN A TELEVISION RECEIVER

[75] Inventor: Juri Tults, Indianapolis, Ind.

[73] Assignee: Thomson Consumer Electronics, Inc., Indianapolis, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/533,951

[22] Filed: Sep. 26, 1995

[51] Int. Cl.⁶ .................................................. H04N 7/00
[52] U.S. Cl. ........................................... 348/468; 348/569
[58] Field of Search ..................... 348/468, 465, 348/461, 553, 569, 730, 706, 460

[56] References Cited

U.S. PATENT DOCUMENTS

| | | | |
|---|---|---|---|
| 4,303,940 | 12/1981 | Ciciora | 358/142 |
| 4,306,250 | 12/1981 | Summers et al. | 358/148 |
| 4,390,901 | 6/1983 | Keiser | 348/468 |
| 4,677,484 | 6/1987 | Pitsch et al. | 358/155 |
| 5,428,400 | 6/1995 | Landis et al. | 348/569 |
| 5,453,795 | 9/1995 | Tults | 348/465 |
| 5,557,336 | 9/1996 | Nakajima | 348/556 |
| 5,572,260 | 11/1996 | Onishi et al. | 348/468 |
| 5,576,768 | 11/1996 | Gomikawa | 348/468 |
| 5,671,253 | 9/1997 | Stewart | 348/555 |
| 5,682,207 | 10/1997 | Takeda et al. | 348/568 |

FOREIGN PATENT DOCUMENTS

| | | | |
|---|---|---|---|
| 0403003 | 12/1990 | European Pat. Off. | H04N 7/087 |
| 2231470 | 11/1990 | United Kingdom | G09G 1/16 |
| 2259219 | 3/1993 | United Kingdom | H04N 5/92 |
| WO91/15083 | 10/1991 | WIPO | H04N 5/782 |
| 9322876 | 11/1993 | WIPO | H04N 7/087 |
| WO94/06243 | 3/1994 | WIPO . | |
| WO94/07334 | 3/1994 | WIPO . | |
| 9417628 | 8/1994 | WIPO | H04N 5/445 |

Primary Examiner—Victor R. Kostak
Attorney, Agent, or Firm—Joseph S. Tripoli; Peter M. Emanuel; Robert D. Shedd

[57] ABSTRACT

A decoder for decoding data from a data signal component of a television signal, such as closed caption data, decodes the data signal in response to a deflection signal during a normal mode of operation of a television receiver and in response to separated sync signal during a standby mode of operation of the television receiver.

16 Claims, 5 Drawing Sheets

SYSTEM PROVIDING STANDBY OPERATION OF AN AUXILIARY DATA DECODER IN A TELEVISION RECEIVER

FIELD OF THE INVENTION

The present invention involves television signal processing systems that decode an auxiliary data signal component, such as closed caption data, that may be included in a television signal.

BACKGROUND

In accordance with the Television Decoder Circuitry Act of 1990, all television sets sold in the United States that are 13" or larger in size must include capability for decoding closed caption (CC) information that is included in a data signal component of many television signals. The CC data signal component comprises two bytes of data during each occurrence of line 21 of field 1 of the television signal. A CC decoder extracts the data from the CC data signal component. The video processing portion of the television receiver produces an output video signal that includes both video program information and information corresponding to the CC data. A portion of a displayed image produced in response to the output video signal includes text corresponding to the CC data. The CC data may represent the audio program portion of a television program in which case the displayed text provides a visible representation of the audio program.

Other types of data components may also be included in a television signal in a form suitable for decoding using a decoder such as a closed caption decoder. For example, extended data services (XDS) data such as time of day information, program title, etc. may be included in line 21 of field 2 of the television signal in accordance with EIA 608 specifications. Also, teletext data and Starsight® program guide data may be included in various horizontal line intervals during vertical blanking such as line 16. The term auxiliary data as used herein includes any type of data component of a television signal that can be extracted using a decoder such as a closed caption decoder, including closed caption, XDS, teletext and Starsight® data. Similarly, the term auxiliary data decoder as used herein includes decoders for decoding the various types of auxiliary data described above.

To accurately decode auxiliary data, an auxiliary data decoder must be timed to operate during the portions of the horizontal display intervals that include auxiliary data, e.g., the latter half of line 21 of field 1 for closed caption data. A television receiver produces various timing signals that indicate when horizontal display intervals occur. For example, separated horizontal sync signals are produced in response to a synchronization signal component of the television signal. Also, horizontal deflection signals are generated to control electron beam deflection functions of an image display device, such as a kinescope.

Controlling an auxiliary data decoder with a deflection signal may increase the reliability of the decoded data. Decoder features, such as horizontal line and delay counters controlled by pulses in a sync signal, may count incorrectly in response to noise pulses in the sync signal causing the decoder to operate improperly. A sync signal that is derived from the television signal may include noise pulses corresponding to noise in the television signal. In comparison, deflection signals are generated using phase-locked loop (PLL) circuits that produce stable, uniform amplitude pulse waveforms that are less likely to include noise effects. Thus, it may be desirable to control an auxiliary data decoder using deflection signals.

SUMMARY OF THE INVENTION

The present invention resides in part in recognizing that it may be desirable to operate a closed caption decoder that is controlled using a deflection signal during a mode of operation when deflection signals are not available. Television receivers typically have normal and standby modes of operation. During normal mode, all circuits are powered, including deflection circuits, and the receiver generates all signals, including deflection and video output signals, needed to produce an image on a display device. During standby mode, the television receiver is turned off disabling the display device and deflection signals are not needed for controlling the display device. To reduce power consumption during standby mode, deflection circuits may be deactivated. As a result, features that rely on deflection signals, such as auxiliary data decoding, are inoperative during standby mode. However, it may be desirable to receive and decode auxiliary data during standby mode. For example, XDS and Starsight® data can be received, decoded and stored in memory during standby mode and displayed during a subsequent normal operating mode as part of a program guide feature. Because only certain television signals include XDS and Starsight® data, e.g., signals from Public Broadcasting System (PBS) channels, it may be necessary to tune to a particular channel to receive the auxiliary data. Tuning, receiving and processing auxiliary data during standby mode avoids interfering with use of the television receiver during normal mode.

In addition to recognizing the described problem, the present invention resides in solving the problem by providing a system that decodes an auxiliary data signal component of a television signal in response to a first timing signal during one mode of operation of the system and in response to a second timing signal during another mode of operation of the system.

BRIEF DESCRIPTION OF THE DRAWING

The invention may be better understood by referring to the enclosed drawing in which.

DETAILED DESCRIPTION

Figure 1:
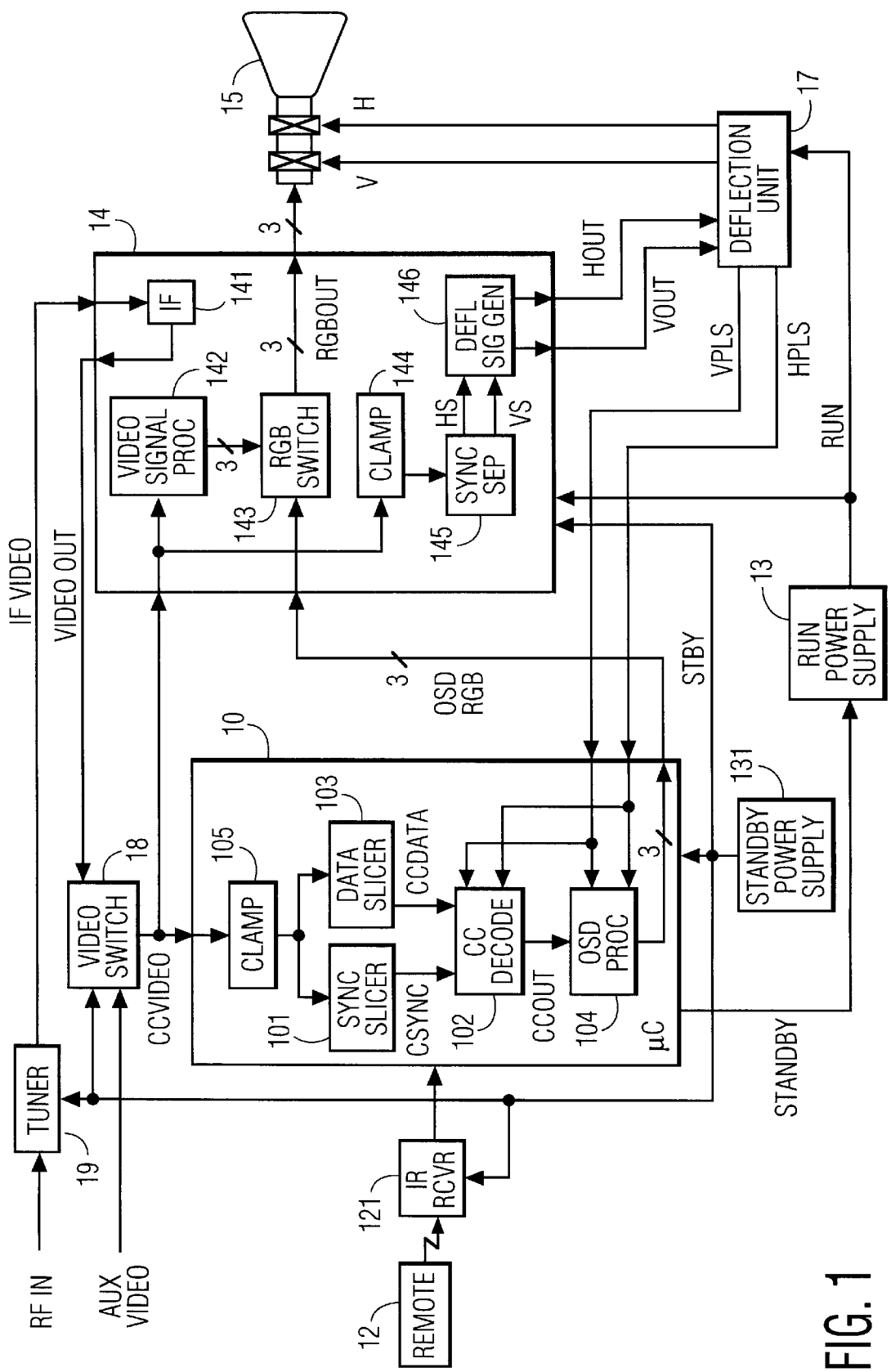
FIG. 1 shows, in block diagram form, an embodiment of a portion of a television receiver constructed in accordance with principles of the invention.

FIG. 1 shows a portion of a television receiver that includes closed caption decoding capability. In FIG. 1, signal RF IN from an RF source such as an antenna or cable is coupled to tuner 19 for tuning a particular television channel to produce signal IF VIDEO representing the tuned channel signal at IF frequencies. Signal IF VIDEO is coupled to a television signal processing integrated circuit (IC) designated 14 in FIG. 1. Integrated circuits such as IC 14 are also known as a television "one-chip" or "jungle chip" IC's. An example of an IC suitable for providing the functionality of IC 14 in FIG. 1 is the LA7612 IC manufactured by Sanyo. Also shown in FIG. 1 is microcontroller ($\mu$C) IC 10 that provides features including a central processing unit (CPU), RAM, ROM and on-screen display (OSD) processing capability. An example of a $\mu$C device that provides the listed features is the ST9 processor manufactured by SGS-Thomson, Inc.

As described below, $\mu$C 10 also includes auxiliary data decoding capability in accordance with principles of the invention.

In FIG. 1, IC 14 includes IF section 141 comprising conventional IF circuitry for processing signal IF VIDEO to produce a baseband video signal VIDEO OUT at an output of IC 14. Signal VIDEO OUT is coupled to video switch 18 which selects one of signal VIDEO OUT and an auxiliary baseband video signal AUX VIDEO as the source for signal CC VIDEO. Signal AUX VIDEO may be provided, for example, by a baseband video output from a second television receiver such as a VCR. Signal CC VIDEO includes video, synchronization, and data signal components and is coupled to IC 14 for video processing and to microcontroller ($\mu$C) IC 10 for closed caption processing.

Signal CC VIDEO is processed by video signal processing section 142 in IC 14 to produce red, green and blue (R, G and B) signals that represent the video information component of signal CC VIDEO. Unit 142 includes conventional luma processing, chroma processing and matrixing functions. The R, G and B outputs from unit 142 are coupled to RGB switch 143 which selects either R, G and B signals from unit 142 or signals OSD RGB from on-screen display (OSD) processor 104 in $\mu$C 10 as the source of R, G and B outputs RGBOUT from IC 14. As will be explained in more detail below, signals OSD RGB from OSD processor 104 represent graphics information, such as channel number or time of day, and closed caption information that is to be included in a displayed image. Switch 143 is controlled by a control signal (not shown in FIG. 1) that is generated by $\mu$C 10 such that signals OSD OUT are the source of signals RGBOUT during intervals when graphics or closed caption data is to be included in a displayed image. Signals RGBOUT are coupled to a display device, such as kinescope 15 in FIG. 1, to produce an image having one portion representing the video information component of signal CC VIDEO, a second portion representing graphics and a third portion representing the closed caption data signal component of signal CC VIDEO.

Also included in IC 14 are clamp 144, sync separator 145 and deflection signal generator 146 for processing signal CC VIDEO to produce deflection signals HOUT and VOUT. Signals HOUT and VOUT exhibit low-amplitude pulse waveforms that are processed further by deflection unit 17 to produce high-amplitude ramp signals H and V for controlling a deflection function of display device 15. Clamp 144 clamps a DC component of signal CC VIDEO to a level, such as the pedestal level of the video signal. Sync separator 145 produces a composite sync signal by comparing the clamped video signal to a reference level that is approximately midway between the clamped DC level and the peak amplitude of sync pulses in the synchronization signal component of the clamped video signal. Circuits suitable for implementing clamp 144 and sync separator 145 are described in detail in International Patent Application No. PCT/US 93/07163 (published Mar. 31, 1994 under International Publication No. WO 94/07334) filed Jul. 29, 1993 in the name of Juri Tults and designating the United States. The indicated International Patent Application is commonly assigned with the present application and is hereby incorporated by reference. Also included in sync separator 145 are horizontal and vertical sync separator circuits that produce horizontal and vertical sync signals HS and VS, respectively, in response to the described composite sync signal.

Deflection signal generator 146 includes circuits that provide pulse waveforms HOUT and VOUT in response to the horizontal and vertical sync signal HS and VS from sync separator 145. For example, unit 146 includes a phase locked loop (PLL) that responds to horizontal sync pulses in separated sync signal HS to provide a stable pulse waveform at the horizontal scan rate in signal HOUT. Signals HOUT and VOUT are coupled to deflection unit 17 in FIG. 1 which includes high voltage amplifiers and transformers for converting relatively low amplitude pulse signals HOUT and VOUT into large amplitude ramp signals H and V that control the deflection function of kinescope 15. In addition, deflection unit 17 includes flyback pulse generation circuitry for producing horizontal and vertical flyback pulses HPLS and VPLS, respectively. In addition to providing deflection control, flyback pulses HPLS and VPLS are coupled to $\mu$C 10 and are used to control closed caption decoding in accordance with aspects of the invention that are explained below. The described features of deflection unit 17 are known, for example, from the CTC-176 color television chassis manufactured by Thomson Consumer Electronics, Inc., Indianapolis, Ind.

Also shown in FIG. 1 are standby and run power supplies 131 and 13, respectively. Standby supply 131 produces supply voltage STBY both during a normal operating mode of the system (i.e., the system is turned on and producing an image on display device 15) and during a standby mode of operation (i.e., the system is turned off and does not display an image). Run supply 13 provides supply voltage RUN only during normal operating mode. During standby mode, the system is connected to the AC mains but supply voltage RUN is not produced. Whether or not run supply 13 produces voltage RUN is controlled by signal STANDBY from $\mu$C 10. For example, a logic 0 on signal STANDBY indicates normal mode and closes a switch in run supply 13 causing supply voltage RUN to be produced. Signal STANDBY at logic 1 indicates standby mode, opens the switch in run supply 13 and disables generation of voltage RUN. Microcontroller 10 produces signal STANDBY in response to power on/off commands from a user. For example, a user activates a power on/off button on remote control 12 to turn off the system. An infrared (IR) signal representing the command is produced by remote 12 and received by IR receiver 121. IR receiver 121 converts the IR signal into a digital signal that is processed by $\mu$C 10 resulting in signal STANDBY being set to logic 1, thereby disabling generation of voltage RUN.

Supply voltage STBY is supplied to the functions in FIG. 1 that must operate during both normal and standby modes. For example, $\mu$C10 must operate during both modes for generating control signals such as signal STANDBY. More specifically, user activation of both a "power off" button on remote 12 during normal mode and a "power on" button during standby mode must be recognized and processed by $\mu$C10 to control the state of signal STANDBY. Signal STANDBY is also coupled to tuner 19, video switch 18 and one-chip 14 because signal CC VIDEO must be produced during standby mode so that auxiliary data such as Starsight® data can be received and decoded.

Supply voltage RUN is coupled to functions that are not needed during standby mode. By removing power from certain circuits during standby mode, power consumption can be reduced significantly. For example, during standby mode signals V and H are not needed because a display is not produced. Therefore, deflection unit 17 receives supply voltage RUN and is disabled during standby mode. Disabling the high voltage circuits that generate signals H and V significantly reduces power consumption, but doing so prevents signals that are derived from the high voltage signals, such as flyback signals HPLS and VPLS, from being generated. The lack of signals HPLS and VPLS during standby mode affects auxiliary data decoding during standby mode and is addressed by aspects of the invention as described below. In addition to disabling deflection unit 17 during standby mode, certain functions of IC 14 such as chroma processing are unnecessary during standby mode. These portions of IC 14 are powered by supply voltage RUN and disabled during standby mode.

FIG. 1 also shows exemplary auxiliary data decoding capability included within micro-controller 10. More specifically, closed caption data is decoded from signal CC VIDEO by caption data processing features comprising clamp 105, sync slicer 101, CC data slicer 103 and CC decoder 102. Clamp 105 and sync slicer 101 and data slicer 103 may be implemented using circuits that are described in detail in above-mentioned International Patent Application No. PCT/US 93/07163. Similar to clamp 144 in IC 14, clamp 105 clamps a DC component of signal CC VIDEO to a desired level. Sync slicer 101 and data slicer 103 include respective comparators that compare the clamped CC VIDEO signal to reference levels representing 50% of the sync pulse amplitude and 50% of the auxiliary data amplitude, respectively. Thus, the output of sync slicer 101 is a binary signal CSYNC that includes composite sync information, i.e., both horizontal and vertical sync pulses. The timing characteristics of the sync pulses in signal CSYNC are synchronized with corresponding characteristics of the synchronization signal component of CC VIDEO. The output of data slicer 103 is a binary signal CCDATA that represents the auxiliary data signal component of signal CC VIDEO during the auxiliary data interval (e.g., the latter half of line 21 of field 1 for closed caption data).

During normal mode operation when a display is being produced on kinescope 15, auxiliary data in signal CCDATA that is intended to be included in the displayed image, such as closed caption data, is processed by OSD processor 104 in $\mu$C 10 to produce R, G and B signals OSD RGB that represent the closed caption data. More specifically, a ROM included in OSD processor 104 stores a "lookup table" that translates the binary values in signal CCDATA into binary codes representing R, G and B color signal values. The binary color signal values are converted into analog signals OSD RGB by digital to analog converters (DAC) included in $\mu$C 10. RGB switch 143 in IC 14 couples signals OSD RGB to display unit 15 during intervals when the auxiliary data is to be displayed.

Figure 2:
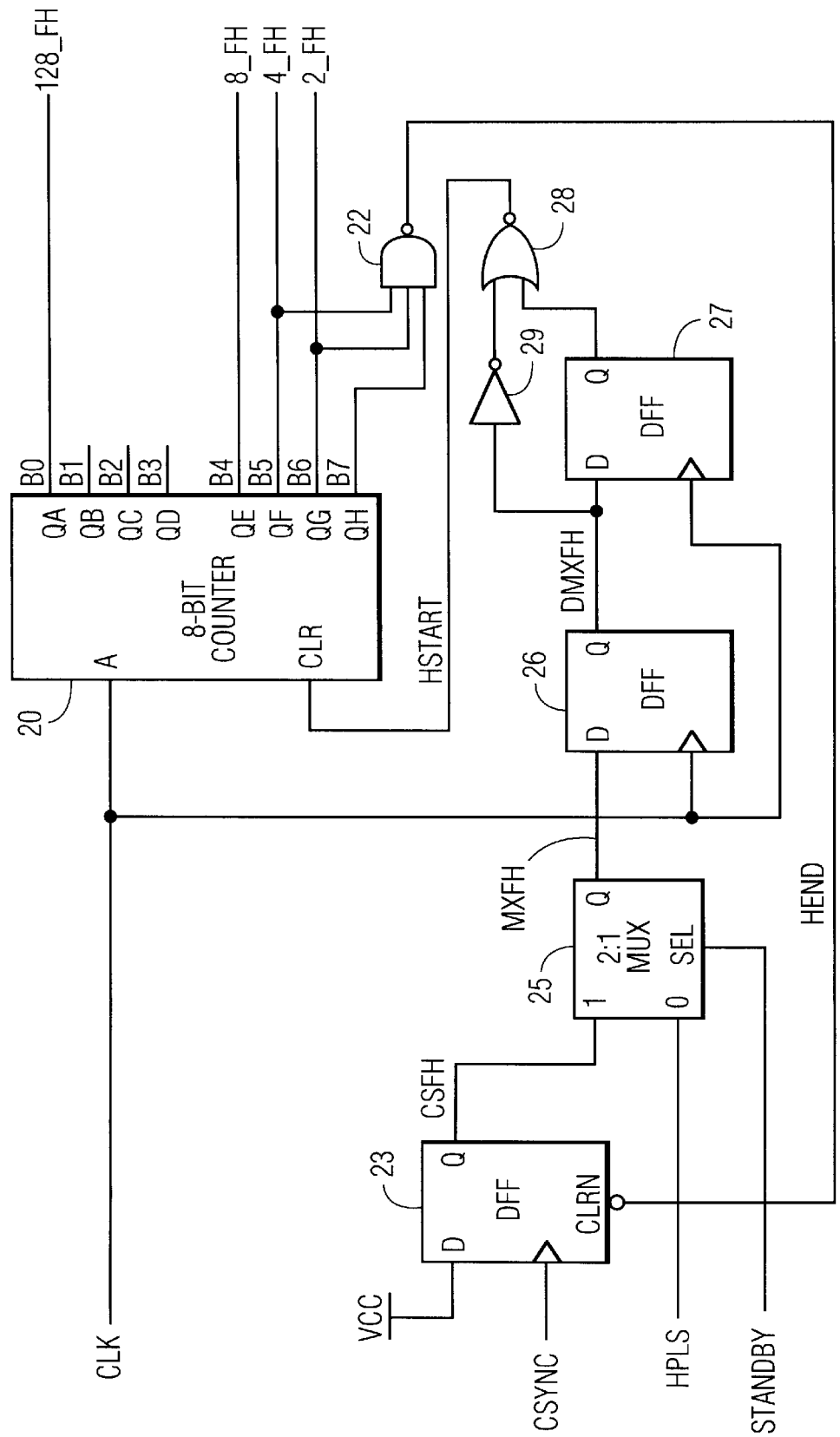
FIG. 2 shows, in schematic diagram form, an embodiment of a first portion of an auxiliary data decoder included in the television receiver of FIG. 1.

FIG. 2 shows a portion of CC decoder 102 of FIG. 1 in more detail. The circuit shown in FIG. 2 produces output signals 2_FH, 4_FH, 8_FH and 128_FH that provide clock pulses at 2, 4, 8 and 128 times the horizontal scan rate FH, respectively, where FH is approximately 15.75 kHz for NTSC systems. The clock pulses are used for timing various operations of the CC decoder. For example, pulses in signal 2_FH indicate half-line intervals and can be used to enable CC data extraction during the latter half of line 21. Input signals in FIG. 2 include a clock signal CLK and three signals that are described above in regard to FIG. 1: composite separated sync signal CSYNC, deflection signal HPLS and power supply control signal STANDBY. Signal CLK is a 4 MHz signal that may be generated, for example, by a crystal oscillator that generates the master clock signal for $\mu$C 10.

As shown in FIG. 2, output signals 128_FH, 8_FH, 4_FH and 2_FH are generated at outputs of 8-bit counter 20. Counter 20 is a ripple counter having a toggle input that receives signal CLK. The least significant output of counter 20, i.e., output QA, changes state in response to each falling edge (logic 1 to logic 0 transition) of signal CLK. The result is that output QA produces pulses at half the frequency of signal CLK. When the frequency of signal CLK is 4 MHz, signal 128_FH at output QA exhibits a frequency that is approximately 128 times the horizontal frequency FH. Each output of counter 20 produces a signal that is half the frequency of the next least significant output signal. Thus, output QB produces a signal at approximately 64 times FH and the most significant output of counter 20, i.e., output QH, produces a signal at a frequency approximately equal to FH. Other signals at 2, 4 and 8 times the horizontal frequency, i.e., 2_FH, 4_FH and 8_FH are produced at outputs QG, QF and QE, respectively, as shown in FIG. 2.

Counter 20 has a "clear" input labeled CLR in FIG. 2 that receives signal HSTART. As described further below, signal HSTART is generated in response to a horizontal sync signal. At the beginning of each horizontal line interval, signal HSTART exhibits a logic 1 value that resets all outputs of counter 20 to logic 0. Thus, the count produced by counter 20 during each line interval begins at zero at the beginning of each line interval.

Eight-bit counter 20 can be implemented by coupling together two 4-bit ripple counter logic circuits such as the circuits included in a 74393-type IC. A first 4-bit counter produces the four least significant bits of the count, i.e., outputs QD, QC, QB and QA of counter 20, and a second 4-bit counter produces the four most significant count bits, i.e., outputs QH, QG, QF and QE of counter 20. The most significant output of the first counter is coupled to the toggle input of the second counter.

Also in FIG. 2, D-type flip-flop (DFF) 23 generates pulse signal CSFH at output Q of DFF 23. Signal CSFH at output Q of D-type flip-flop (DFF) 23 is produced in response to signal CSYNC at the clock input of DFF 23. The D input of DFF 23 is coupled to logic 1 (VCC). As a result, each rising edge (logic 0 to logic 1) on signal CSYNC produces a logic 1 on signal CSFH. A clear input of DFF 23, labeled CLRN in FIG. 2, receives signal HEND which is produced by combining the three most significant output signals of counter 20 via NAND gate 22. Signal CSFH is forced to logic 0 by a logic 0 that occurs on signal HEND during the last eighth of each horizontal line interval (i.e., the last 8 us). As a result, pulses occur on signal CSFH at frequency FH and are synchronized with the horizontal sync component of the input television signal. In addition, the pulses exhibit a duty cycle of approximately 87.5%, i.e., signal CSFH is at logic 1 (VCC) for the first 56 us of a horizontal line interval and is at logic 0 (ground) for the remaining 8 us of the line interval. The duty cycle ensures that the pulse waveform of signal CSFH is not affected by half line pulses on signal CSYNC that exist during the vertical interval, i.e., equalizing and vertical sync pulses.

Signals CSFH and HPLS are coupled to respective inputs of 2-to-1 multiplexer (2:1 MUX) 25. MUX 25 acts as a switch for coupling one of signals CSFH and HPLS to output Q of MUX 25 in response to signal STANDBY at select input SEL of MUX 25. When signal STANDBY is at logic 1, i.e., standby mode of operation, signal CSFH is coupled to output Q of MUX 25. When signal STANDBY is at logic 0, i.e., normal mode of operation, signal HPLS is coupled to output Q. Thus, signal MXFH at output Q of MUX 25 is a pulse signal at frequency FH that is synchronized with deflection signal HPLS during normal mode operation and with the synchronization component of the input television signal during standby mode operation.

The output of MUX 25 controls generation of signal HSTART via a circuit comprising DFF 26, DFF 27, 2-input NOR gate 28 and inverter 29. Signal HSTART is coupled to the CLR input of counter 20 and, therefore, "clears" or resets counter 20 when at logic 1. DFF 26 samples signal MXFH during positive transitions of signal CLK to produce signal DMXFH at the Q output of DFF 26. In addition, DFF 26 synchronizes signals DMXFH and HSTART with signal CLK. Initially, signal DMXFH is at logic 0 causing the Q output of DFF 27 to be logic 0 and the output of inverter 29 to be logic 1. Signal HSTART at the output of NOR gate 28 is at logic 0 in response to the logic 1 at the output of inverter 29, thereby enabling counter 20. The next rising edge of signal CLK after MXFH goes to logic 1, i.e., the beginning of a horizontal line interval, causes signal DMXFH to change to logic 1 and the output of inverter 29 to become logic 0. Because both the Q output of DFF 27 and the output of inverter 29 are at logic 0, signal HSTART becomes logic 1 via NOR gate 28 and resets counter 20. The next rising edge of signal CLK clocks the logic 1 value on signal DMXFH through to the Q output of DFF 27 causing signal HSTART to become logic 0 and enable counter 20. Thus, signal HSTART exhibits positive pulse having a width equal to one cycle of signal CLK that resets counter 20 at the beginning of each horizontal line interval. The brief duration of the pulse on signal HSTART ensures that the count in counter 20 will change from 00 hex to 01 hex in response to the next rising edge of signal CLK.

Thus, signal HSTART synchronizes generation of the CC decoder control signals by counter 20 with the start of a horizontal line interval as indicated by signal MXFH. Because signal MXFH is produced in response to signal HPLS or signal CSYNC depending on the mode of operation of the system, generation of the CC decoder control signals is controlled in response to deflection signal HPLS during normal operation and in response to separated sync signal CSYNC during standby operation as desired.

Figure 3:
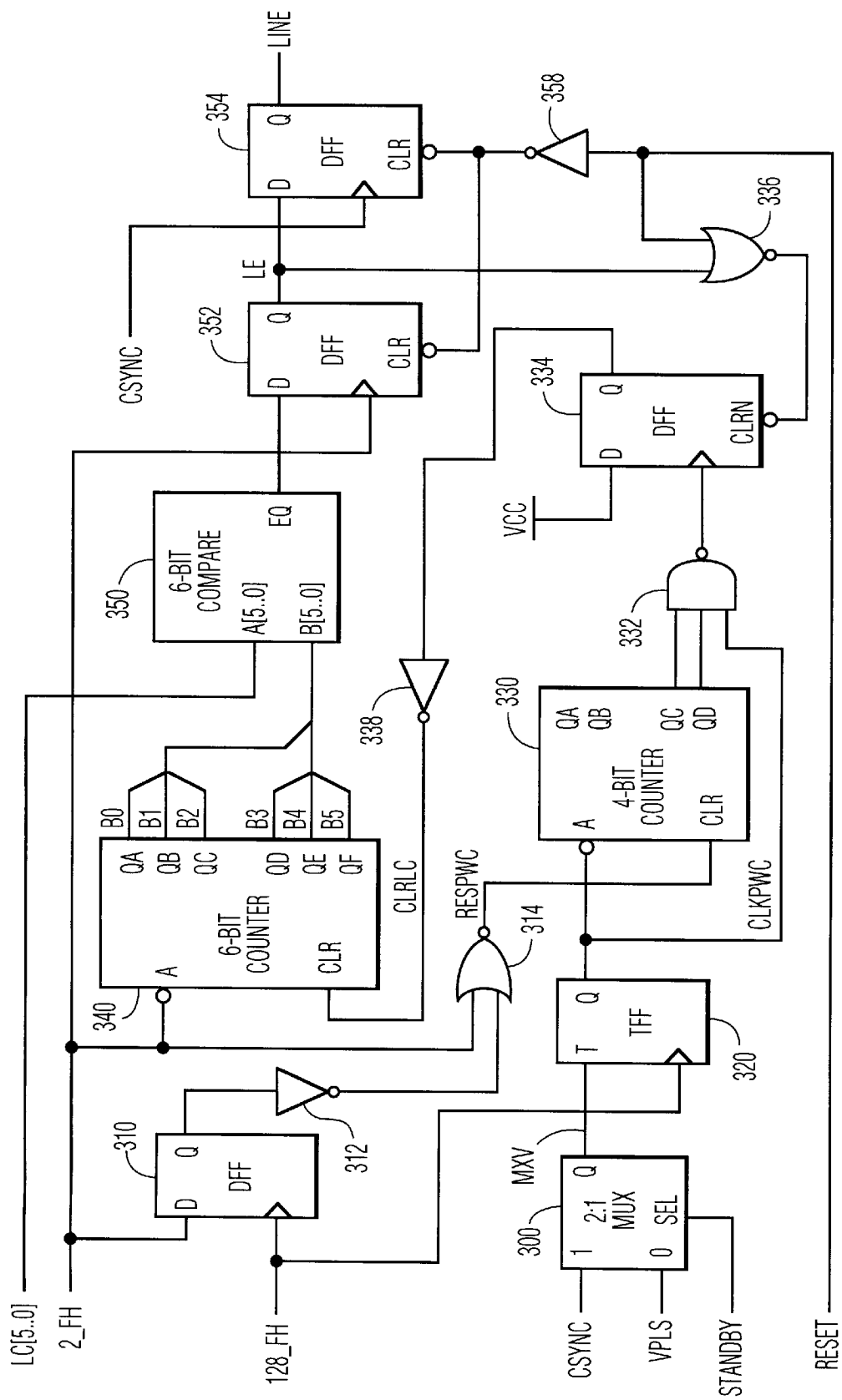
FIG. 3 shows, in schematic diagram form, an embodiment of a second portion of an auxiliary data decoder included in the television receiver of FIG. 1.

In addition to locating the CC data interval within a particular line using the embodiment in FIG. 2, it is also necessary to locate the particular line that includes the CC data interval, e.g., locate line 21 of field 1. One approach is to use a vertical sync signal that indicates the beginning of a field interval to initialize a counter and count horizontal line intervals after vertical sync in response to horizontal sync. The line count is monitored to determine when the desired line interval occurs. Because deflection circuits produce reliable waveforms as discussed above, a vertical deflection signal VPLS could be used to initialize a line counter. However, as discussed above, it may be necessary to operate a CC decoder including a line counter during standby mode when deflection signals are not produced. FIG. 3 shows an embodiment of a horizontal line counter that operates in response to a vertical deflection signal during normal operating mode and in response to a vertical sync signal separated from the television signal during standby mode.

In FIG. 3, input signals RESET and LC[5..0] are control signals generated by the CPU of μC 10 in FIG. 1. When signal RESET is at logic 1, the outputs of D-type flip-flops (DFF) 352, 354 and 334 are reset to logic 0. Signal RESET is active (at logic 1) typically at the beginning of operation of the circuit such as when power is first applied (the television receiver is connected to the AC mains). Signal LC[5..0] is a 6-bit binary value (most significant bit LC[5] through least significant bit LC[0]) that determines which horizontal line interval will be detected. As will be explained in detail below, the value of LC[5..0] represents a count of half-line intervals that is compared to the output of a horizontal line counter to indicate the beginning of the desired horizontal line interval. The CPU can change the value of LC[5..0] under software control to change the horizontal line that is detected. Modifying LC[5..0] permits the CC decoder to decode different types of CC data that occur in various horizontal line intervals.

Figure 4:
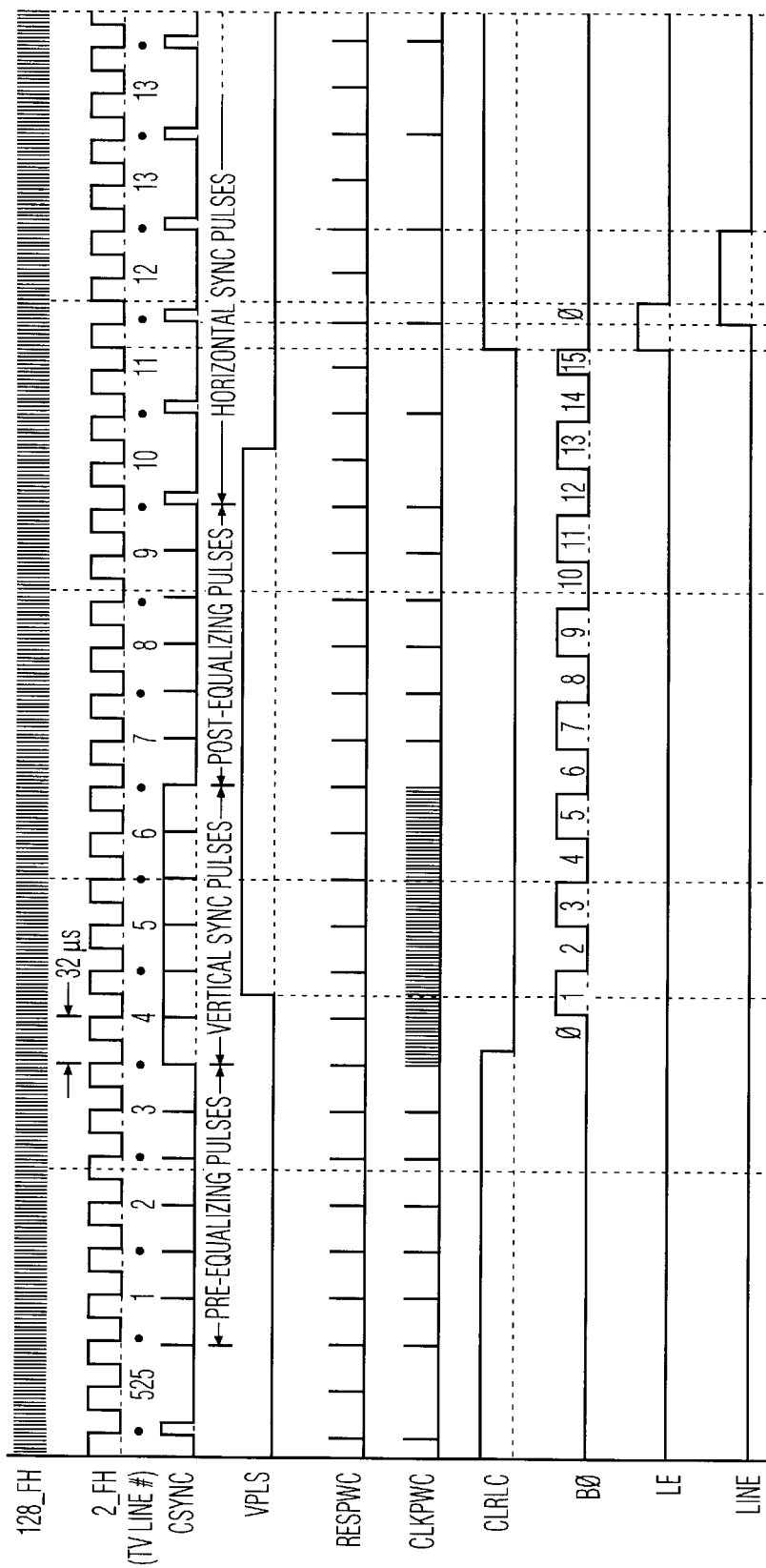
FIG. 4 shows a timing diagram illustrating the operation of the embodiment shown in FIG. 3.

For the exemplary embodiment shown in FIG. 3, the relationship between the value of LC[5..0] and the particular line identified by the system is: LC[5..0]=N*2−9, where N is the line to be identified in an NTSC signal. N is multiplied times two because half-line intervals are counted as explained below. For timing reasons that are also explained below, counting of half-line intervals begins in response to detection of the first wide vertical pulse in the input sync signal. Nine is subtracted from N*2 to correct the half-line count for the position, in half-line intervals, of the first wide vertical sync pulse in NTSC signals. The described relationship between LC[5:0] and N can be better understood by referring to FIG. 4 which shows a timing diagram for certain signals in FIG. 3. As FIG. 4 shows, the first wide vertical pulse in field 1 begins at the start of line 4, i.e., the beginning of the seventh half-line interval in field 1. Nine is subtracted rather than seven because the timing of the operation of the embodiment in FIG. 3 involves an additional line interval as will become apparent from the following description. Exemplary values for N and LC[5..0] of 12 and 15, respectively, are used in the following description. Thus, line 12 is detected when the half line count equals 15. Different values may be used for N and L to detect other horizontal lines. For example, N and L equal to 21 and 33, respectively, would be used to detect line 21 for decoding closed caption data.

Input signals 2_FH, 128_FH, CSYNC and STANDBY in FIG. 3 correspond to signals in FIG. 2 having the same names. Signal VPLS in FIG. 3 corresponds to the signal of the same name in FIG. 1. Two-to-one MUX 300 in FIG. 3 determines whether horizontal line detection will occur in response to separated sync signal CSYNC or vertical deflection signal VPLS. Signal STANDBY at logic 1 couples signal CSYNC to signal MXV at the output of MUX 300 while STANDBY at logic 0 couples signal VPLS to signal MXV. The following explanation of the exemplary embodiment shown in FIG. 3 will first address signal CSYNC being coupled to signal MXV, i.e., signal STANDBY at logic 1.

To ensure that horizontal line detection is synchronized with vertical sync rather than with noise or with horizontal sync pulses included in composite sync signal CSYNC, operation begins by detecting the first wide vertical sync pulse in signal MXV. A wide vertical sync pulse is typically 30 μs long while horizontal sync and equalizing pulses are 4 μs and 2 μs long, respectively. Noise pulses are typically of very brief duration. In FIG. 3, the first wide vertical pulse in signal MXV is detected when the first pulse that is at least 12 μs is found. A pulse width of 12 μs is sufficiently greater than the duration of noise, horizontal or equalizing pulses to avoid spurious pulse detection and sufficiently less than the 30 μs width of the first wide vertical pulse to provide margin for timing errors between the detection operation and pulses in signal MXV.

The first wide vertical pulse is detected by a circuit comprising toggle flip-flop (TFF) 320, 4-stage ripple counter 330 and NAND gate 332. Counter 330 is reset every 32 μs by signal RESPWC, a narrow pulse generated at each falling edge (logic 1 to logic 0 transition) of signal 2_FH by D-type flip flop (DFF) 310, inverter 312, and NOR gate 314. Counter 330 is clocked by signal CLKPWC at 1 μs intervals as long as signal MXV is at logic 1. Signal CLKPWC is generated by toggle flip flop (TFF) 320 which has a clock input coupled to signal 128_FH and a toggle input (T) coupled to signal MXV.

A count of 12 in counter 330 (outputs QD and QC equal to logic 1) causes a pulse to be produced at the output of NAND gate 332 when signal CLKPWC is high, indicating detection of a wide pulse. A pulse at the output of NAND gate 332 clocks DFF 334 causing the output of DFF 334 to become logic 1. As a result, signal CLRLC at the output of inverter becomes logic 0 enabling 6-bit counter 340. After being enabled, counter 340 counts half line intervals by incrementing the count value at the output of counter 340 in response to each falling edge of signal 2_FH.

Six-bit comparator 350 compares the count value at the output of counter 340 (outputs QF through QA) to the value of input signal LC[5..0]. When the count value equals value LC[5..0], signal EQ at the output of comparator 350, and the D input of DFF 352, become logic 1. The next rising edge of signal 2_FH clocks the logic 1 value on signal EQ through DFF 352 causing signal LE at the Q output of DFF 352 to become logic 1. Because signal CSYNC is coupled to the clock input of DFF 354, the first rising edge of signal CSYNC (i.e., the first horizontal pulse) following signal LE becoming logic 1 clocks the logic 1 value of signal LE through DFF 354 and produces a logic 1 on signal LINE. As can be seen in FIG. 4, the first horizontal pulse after signal LE becomes logic 1 is the horizontal pulse corresponding to line 12 and the rising edge of signal LINE coincides with the beginning of line 12 as desired. Signal LE remains at logic 1 for one-half line interval because a value of logic 1 on signal LE clears counter 340 via NOR gate 336, DFF 334 and inverter 338 and produces a logic 0 at output EQ of comparator 350. A logic 0 on signal EQ is clocked through DFF 352 by the next rising edge of signal 2_FH. Signal LINE remains at logic 1 for the duration of line 12 and becomes logic 0 in response the logic 0 value of signal LE being clocked through DFF 354 by the horizontal pulse on signal CSYNC corresponding to line 13.

The preceding explanation involved the operation of the embodiment shown in FIG. 3 during standby mode of operation of the system, i.e., signal STANDBY at logic 1 and signal CSYNC coupled to signal MXV. Operation during normal mode, i.e., signal STANDBY at logic 0 and signal VPLS coupled to signal MXV, is generally the same as during standby mode. However, the value of LC[5:0] that is used may differ in each mode because a significant phase error can exist between the start of the first wide vertical pulse in signal CSYNC and the start of the vertical pulse in signal VPLS. An example of the phase error is shown by the waveforms in FIG. 4. In addition, the exemplary timing relationship between signals CSYNC and VPLS shown in FIG. 4 can vary between different television chassis models requiring that the value of LC[5:0] be modified correspondingly. A more detailed explanation of the phase error problem follows.

As is evident from FIG. 4, the wide vertical pulse on signal VPLS begins during the second wide vertical pulse in signal CSYNC, i.e., the latter half of line 4. Thus, during normal mode when signal VPLS is coupled to signal MXV (signal STANDBY at logic 0), counter 330 detects the beginning of the wide vertical pulse on signal VPLS and enables counter 340 during the latter half of line 4 rather than during the first half as in standby mode. The count value produced by counter 340 increments from 0 to 1 at the end of line 4 and, if the same value of LC[5:0] is used for both modes, reaches the value LC[5:0] one-half line later than during normal mode. As a result, the pulse on signal LINE indicates the middle rather than the beginning of the desired line interval. Decreasing the value of signal LC[5..0] by one when signal VPLS is coupled to signal MXV produces the same timing of signal LINE in either case. As mentioned above, the timing relationship between signal CSYNC and VPLS can vary between television chassis models requiring that the value of LC[5..0] be adjusted accordingly.

It should be noted that other approaches to operating an auxiliary decoder during standby mode are possible. For example, a separated sync signal could be used to control the decoder during all modes of operation of the system. Also, the deflection circuitry could be supplied with standby power, thereby enabling generation of the described deflection signals during standby mode. Another approach is to provide power to the deflection circuitry during standby mode only for a limited time period during which the desired data is available. In the case of Starsight® program-guide data, for example, power could be supplied to the deflection circuitry while the data is being received and removed when data reception is complete. In addition, any approach involving providing power to deflection circuitry during standby mode could involve providing power to only that portion of the deflection circuitry needed to generate the HPLS and VPLS signals. For example, power need not be applied to the horizontal output and high voltage circuits. However, in comparison to the described alternatives, the present invention advantageously provides improved noise immunity during normal mode operation, low power during standby mode operation and low complexity.

Figure 5:
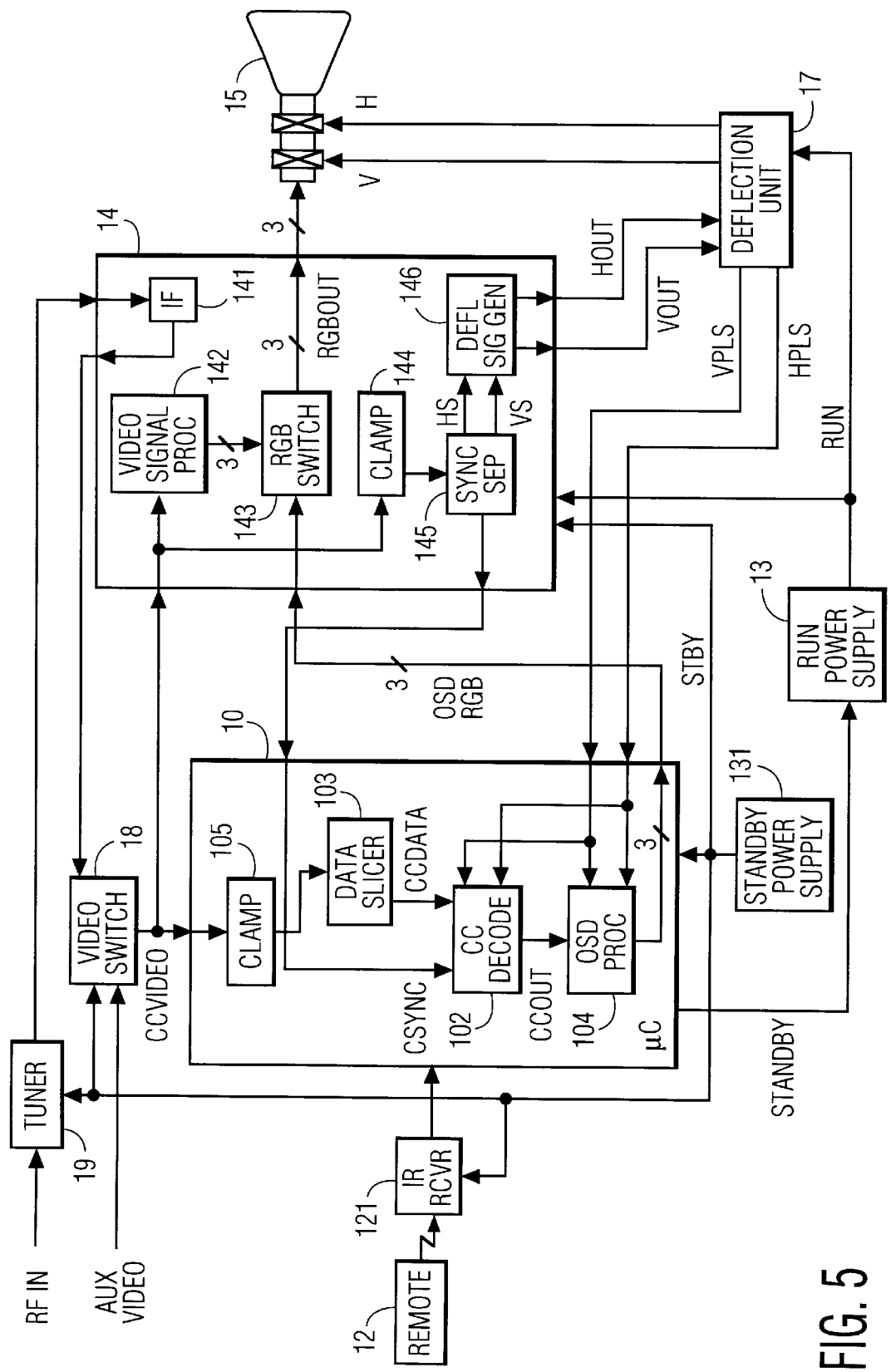
FIG. 5 shows, in block diagram form, a variation of the embodiment shown in FIG. 1.

Various modifications of the described embodiments are possible. For example, FIG. 5 shows a modification of the embodiment in FIG. 1 in which like numbered features represent the same or similar features. In FIG. 5, a composite sync signal generated by sync separator 145 in one-chip IC 14 is output from IC 14 and coupled to μC IC 10 to provide sync signal CSYNC at an input of CC decoder 102. The arrangement shown in FIG. 5 eliminates the need for sync slicer 101 in FIG. 1. However, coupling signal CSYNC from IC 14 to IC 10 requires adding an output pin on IC 14 and an input pin on IC 10. Another possible modification of the described embodiments involves including sync signal source selection only in regard to horizontal signals as in FIG. 2, or only in regard to vertical signals as in FIG. 3, or in regard to both horizontal and vertical signals by combining the embodiments in FIGS. 2 and 3 in one CC decoder design. In addition to the described modifications, various features depicted in FIGS. 2 and 3 as being circuits internal to μC 10 in FIG. 1 could be implemented in hardware external to μC 10, e.g., a decoder box external to the television receiver, or in software that is executed by a control processor such as μC 10. These and other modifications are intended to be within the scope of the following claims.

I claim:

1. A system comprising:

first means for producing a first timing signal in response to a synchronization signal component of a video signal;

second means for producing a second timing signal in response to said synchronization signal component of said video signal; a decoder for decoding data included in a data signal component of said video signal in response to said first timing signal during a first mode of operation of said system and for decoding data included in said data signal component of said video signal in response to said second timing signal during a second mode of operation of said system; and control means for disabling said first means during said second mode of operation, thereby preventing generation of said first timing signal by said first means during said second mode of operation.

2. The system of claim 1 wherein said first mode of operation comprises a normal mode of operation and said second mode comprises a standby mode of operation.

3. The system of claim 2 further comprising:

means for generating a control signal indicating whether said system is in said normal mode of operation or in said standby mode of operation; and a switch responsive to said control signal for coupling said first timing signal to said decoder during said normal mode of operation and for coupling said second timing signal to said decoder during said standby mode of operation.

4. The system of claim 3 wherein said means for generating said first timing signal comprises a deflection signal generating unit and said first timing signal comprises a deflection signal for controlling a display device; said means for generating said second timing signal comprises a sync separator and said second timing signal comprises a separated sync signal derived from said synchronization signal component of said video signal; and said first and second timing signals indicate occurrence of a horizontal display interval.

5. The system of claim 3 wherein said means for generating said first timing signal comprises a deflection signal generating unit and said first timing signal comprises a deflection signal for controlling a display device; said means for generating said second timing signal comprises a sync separator and said second timing signal comprises a separated sync signal derived from said synchronization signal component of said video signal; and said first and second timing signals indicate occurrence of a vertical display interval.

6. The system of claim 4 wherein said decoder comprises means for establishing a duty cycle characteristic of said second timing signal for substantially preventing said decoder from responding to a portion of said synchronization signal component of said video signal.

7. The system of claim 6 wherein said second timing signal indicates a rate of occurrence of horizontal display intervals included in said synchronization signal component of said video signal; and said duty cycle characteristic substantially prevents said decoder from responding to pulses occurring in said synchronization signal component at a rate greater than said rate of occurrence of said horizontal display intervals.

8. The system of claim 7 wherein said synchronization signal component of said video signal comprises a first group of pulses occurring at a horizontal display rate and a second group of pulses occurring at a vertical display rate; said second group of pulses including a particular pulse exhibiting a pulse width greater than a pulse width of each of said pulses included in said first group of pulses; and said apparatus further comprising means for detecting said particular pulse included in said second group of pulses.

9. The system of claim 8 wherein said data signal component represents one of closed caption data and XDS data and Starsight® data.

10. A system comprising:

firstmeans for producing a first timing signal in response to a synchronization signal component of a video signal;

second means for producing a second timing signal in response to said first timing signal;

a decoder for decoding data included in a data signal component of said video signal in response to said first timing signal during a standby mode of operation of said system and for decoding data included in said data signal component of said video signal in response to said second timing signal during a normal mode of operation of said system; and a source of operating power for supplying operating power to said second means during said first mode of operation and for removing said operating power from said second means during said second mode of operation.

11. The system of claim 10 further comprising:

means for generating a control signal indicating whether said system is in said normal mode of operation or in said standby mode of operation; and a switch responsive to said control signal for coupling said first timing signal to said decoder during said normal mode of operation and for coupling said second timing signal to said decoder during said standby mode of operation.

12. The system of claim 11 wherein said means for generating said first timing signal comprises a sync separator and said first timing signal comprises a separated sync signal derived from said synchronization signal component of said video signal; said means for generating said second timing signal comprises a deflection signal generating unit and said second timing signal comprises a deflection signal for controlling a display device; and said first and second timing signals indicate occurrence of a horizontal display interval.

13. The system of claim 11 wherein said means for generating said first timing signal comprises a sync separator and said first timing signal comprises a separated sync signal derived from said synchronization signal component of said video signal; said means for generating said second timing signal comprises a deflection signal generating unit and said second timing signal comprises a deflection signal for controlling a display device; and said first and second timing signals indicate occurrence of a vertical display interval.

14. The system of claim 12 wherein said data signal component represents one of closed caption data and XDS data and Starsight® data.

15. A system for processing a television signal to produce a video signal suitable for coupling to a display device for producing an image on said display device, said system comprising:

a deflection signal generating unit for generating vertical and horizontal deflection signals for controlling said display device during a normal mode of operation of said system;

a sync separator for generating a synchronization signal in response to a synchronization signal component of said television signal during a standby mode of operation of said system; and a decoder for decoding a data signal component of said television signal in response to said vertical and horizontal deflection signals during said normal mode of operation and for decoding said data signal component of said television signal in response to said synchronization signal during said standby mode of operation.

16. The system of claim 15 wherein:

said decoder comprises a first counter responsive to a first control signal for generating a signal exhibiting a frequency substantially equal to a multiple of a horizontal display interval frequency of said video signal; and a second counter responsive to a second control signal for counting horizontal line intervals of said video signal; and wherein said system further comprises:

means for generating a third control signal indicating whether said system is in said normal mode of operation or in said standby mode of operation;

a first switch responsive to said third control signal for coupling said horizontal deflection signal to said first counter to provide said first control signal during said normal mode of operation and for coupling said synchronization signal to said first counter to provide said first control signal during said standby mode of operation; and a second switch responsive to said third control signal for coupling said vertical deflection signal to said second counter to provide said second control signal during said standby mode of operation and for coupling said synchronization signal to said second counter to provide said second control signal during said standby mode of operation.

* * * * *